United States Patent
Viljanen et al.

(10) Patent No.: US 12,275,620 B2
(45) Date of Patent: Apr. 15, 2025

(54) METHOD FOR DETERMINING A DEGRADED GUIDE RAIL CONDITION IN AN ELEVATOR SYSTEM, COMPUTER PROGRAM PRODUCT, AND ELEVATOR SYSTEM

(71) Applicant: KONE Corporation, Helsinki (FI)

(72) Inventors: Mikko Viljanen, Helsinki (FI); Henri Wenlin, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1174 days.

(21) Appl. No.: 17/006,198

(22) Filed: Aug. 28, 2020

(65) Prior Publication Data
US 2021/0061614 A1 Mar. 4, 2021

(30) Foreign Application Priority Data
Aug. 29, 2019 (EP) .................................... 19194303

(51) Int. Cl.
*B66B 5/00* (2006.01)
*B66B 1/34* (2006.01)
*B66B 7/04* (2006.01)
*G01D 5/14* (2006.01)

(52) U.S. Cl.
CPC .......... *B66B 5/0025* (2013.01); *B66B 1/3461* (2013.01); *B66B 7/046* (2013.01); *G01D 5/145* (2013.01)

(58) Field of Classification Search
CPC ..... B66B 5/0025; B66B 1/3461; B66B 7/046; B66B 7/1246; G01D 5/145
See application file for complete search history.

(56) References Cited

U.S. PATENT DOCUMENTS

| | | | |
|---|---|---|---|
| 11,124,386 B2 * | 9/2021 | Fargo | B66B 5/16 |
| 2010/0012437 A1 * | 1/2010 | Smith | B66B 11/028 |
| | | | 187/401 |

(Continued)

FOREIGN PATENT DOCUMENTS

| | | |
|---|---|---|
| EP | 0 503 972 A2 | 9/1992 |
| EP | 0 503 972 A3 | 12/1992 |
| EP | 3 225 578 A1 | 10/2017 |

(Continued)

OTHER PUBLICATIONS

European Search Report, issued in Application No. 19 19 4303, dated Feb. 28, 2020.

*Primary Examiner* — Joseph J Dallo
(74) *Attorney, Agent, or Firm* — Birch, Stewart, Kolasch & Birch, LLP

(57) ABSTRACT

A method for determining a degraded guide rail condition in an elevator system, a computer program product, and an elevator system are disclosed. The method includes obtaining first data including information about movement of an elevator component relative to a guide rail, and obtaining second data including information about movement of an elevator component. The method further includes comparing the first data and the second data to each other, and detecting, based on the comparison, a deviation fulfilling a deviation criterion. Still further, the method includes creating a signal indicating the degraded, such as misaligned, guide rail condition, such as of the first or the second guide rail.

14 Claims, 5 Drawing Sheets

(56) References Cited

U.S. PATENT DOCUMENTS

2013/0126275 A1* 5/2013 Shilpiekandula ......... B66B 7/06
  187/254
2020/0223665 A1* 7/2020 Shiraishi ................... B66B 5/22

FOREIGN PATENT DOCUMENTS

| EP | 3 502 031 A1 | 6/2019 | |
|----|----|----|----|
| EP | 3786098 A1 * | 3/2021 | ........... B66B 1/3461 |
| JP | 2004277043 A * | 10/2004 | |
| WO | WO-03008318 A1 * | 1/2003 | ......... B66B 11/0045 |
| WO | WO-2014057302 A1 * | 4/2014 | ............. B66B 7/047 |

* cited by examiner

METHOD FOR DETERMINING A DEGRADED GUIDE RAIL CONDITION IN AN ELEVATOR SYSTEM, COMPUTER PROGRAM PRODUCT, AND ELEVATOR SYSTEM

FIELD OF THE INVENTION

The present invention relates in general to elevators. In particular, however not exclusively, the present invention concerns monitoring the condition of guide rails in elevator systems.

BACKGROUND

Known elevators comprise an elevator car adapted to move in an elevator shaft along a vertical trajectory which is defined by guide rails. The elevator car has guide shoes, such as sliding guide shoes or guide rollers, which meet the guide rails to guide the movement of the elevator car.

The guide rails are mounted to vertical hoistway structures of the elevator, such as to the walls thereof. They consist of a plurality of guide rail sections placed one after the other. The guide rail sections are fixed to the hoistway structures by means of fixing members, such as brackets.

The guide rails can, however, buckle and bend under certain circumstances. This may affect the elevator ride comfort and may even be a reliability issue and lead to malfunctions. Therefore, it is necessary to detect such a condition. It is known to use different kind of measurement and monitoring equipment for detecting guide rail alignment. However, the pieces of equipment are often expensive. They can also be large, heavy and inconvenient to use in the elevator hoistway.

SUMMARY

An objective of the present invention is to provide a method for determining a degraded guide rail condition in an elevator system, a computer program product, and an elevator system. Another objective of the present invention is that the method, the computer program product, and the elevator system enable detecting a degraded guide rail conditions, such as misaligned guide rail.

The objectives of the invention are reached by a method, a computer program product and an elevator system as defined by the respective independent claims.

According to a first aspect, a method for determining a degraded guide rail condition, such as related to misalignment thereof, in an elevator system is provided.

The elevator system may refer herein to a conventional elevator in which an elevator car is moved in a vertical direction, that is up and down, by a hoisting rope in connection with a hoisting motor. However, the elevator system may alternatively refer to an elevator utilizing an electric linear motor, that is to a ropeless or rope-free elevator, for moving the elevator car in vertical direction or in any direction. Still further, the elevator system may alternatively refer to a conveyor system.

The method according to the first aspect comprises:
obtaining a first data including information about movement of an elevator component, such as of a first elevator component, relative to a guide rail, such as to a first guide rail,
obtaining a second data including information about movement of an elevator component, such as of the first or a second elevator component, preferably relative to a guide rail, such as to the first guide rail or a second guide rail,
comparing the first data and the second data, or characteristics based on said data to each other,
detecting, based on the comparison, a deviation fulfilling a deviation criterion, and, subsequently,
creating a signal indicating the degraded, such as misaligned, guide rail condition, such as of the first or the second guide rail.

In various embodiments, the comparison may relate to comparing a first distance in the first data and a second distance in the second data to each other. The distances may have been determined during certain time interval and/or at certain positions of the guide rail or rails. Alternatively or in addition, the comparison relates to comparing a first speed in the first data and a second speed in the second data to each other. The compared speed values may be average speed values or instantaneous speed values.

Alternatively, in some embodiments, the second data may be or may correspond to a movement reference curve of an elevator car.

Yet in another embodiments, the second data may include information about movement of an elevator car, such as relative to a longitudinal direction of a hoistway. Thus, the second data may have been obtained by utilizing a motor encoder in connection with the hoisting motor. The elevator component may, preferably, be coupled to the elevator car.

In various embodiments, the deviation criterion may be at least one percent, or at least five percent, or at least ten percent difference between the first and the second data, or between the characteristics of said data.

The first data may include information about the movement of a first elevator component relative to a first guide rail, and the second data may include information about the movement of a second elevator component relative to a second guide rail. Additionally, the first data and the second data may include information about movement during same time instances or intervals.

Alternatively, the first data may include information about the movement of a first elevator component relative to a first guide rail during a first time interval, and the second data may include information about the movement of the first elevator component relative to the first guide rail during a second time interval.

In some embodiments, the elevator component, such as the first and/or the second elevator component, may comprise a guide element arranged to move in contact with the guide rail, or at least along a path, a shape of which corresponds to a shape of a guide surface of the guide rail. The elevator component may further comprise, or at least be in connection thereto, determining means for determining at least one of the following: a position, a distance travelled, a speed of the elevator component relative to the guide rail. In such cases, the method may comprise determining, by the determining means, at least one of the following: the position, the distance travelled, the speed of the elevator component relative to the guide rail. The first and/or the second data may then be arranged to include the determined information.

Optionally, the guide element may be a guide roller, such as of a guide roller shoe.

In some embodiments, the determining means may comprise a rotary encoder, such as in connection with the guide roller. In such cases, the method may comprise determining, by the rotary encoder, at least one of the following: the position, the distance travelled, the speed of the elevator component relative to the guide rail. Still further, the rotary encoder may be a magnetic encoder or an optical encoder or a capacitive encoder, or an inductive encoder, such as arranged to the elevator component or at least in functional connection thereto.

In various embodiments, the guide rail may comprise at least partly along its length position markings or at least one strip of position marks, such as including magnets; and the elevator component, such as the first and/or the second elevator component, comprises a reader device for reading the position markings or marks, respectively. In such embodiments, the method may comprise determining, by the reader device, at least one of the following: a position, a distance travelled, a speed of the elevator component relative to the guide rail, wherein the first and/or the second data is arranged to include the determined information.

In some embodiments, the method may comprise sending information about the degradation of a guide rail, preferably information about the degree of degradation of the guide rail, to a remote maintenance server. The information may be used for preventive maintenance of elevators (elevator maintenance service may be provided before the progressing degradation causes interruption of elevator operation).

According to a second aspect, a computer program product, such as stored in a device including a non-volatile or a non-transitory memory storage medium, is provided. The computer program product comprises program instructions which when executed by a control unit cause the elevator system to perform the method according to the first aspect.

According to a third aspect, an elevator system is provided. The elevator system comprises at least one elevator component, such as a first elevator component and/or a second elevator component. The elevator system also comprises at least one guide rail, such as a first guide rail and/or a second guide rail, wherein the at least one elevator component is arranged to move relative to, preferably in a longitudinal direction of, the guide rail. Still further, the elevator system comprises a control unit, such as comprising at least one processor and at least one memory for storing at least one portion of computer program code therein. The control unit configured to:

obtain a first data including information about movement of one of the at least one elevator component, such as of the first elevator component, relative to one of the at least one guide rail, such as to the first guide rail, obtain a second data including information about movement of one of the at least one elevator component, such as of the first or the second elevator component, preferably relative to one of the at least one the guide rail, such as to the first guide rail or the second guide rail, compare the first data and the second data, or characteristics based on said data to each other, detect, based on the comparison, a deviation fulfilling a deviation criterion; and, subsequently, create a signal indicating the degraded, such as misaligned, guide rail condition, such as of the first or the second guide rail.

In various embodiments, the elevator system may comprise a guide element, such as a guide roller, arranged to move in contact with the guide rail, or at least along a path, a shape of which corresponds to a shape of a guide surface of the guide rail. The elevator system may further comprise determining means, such as a magnetic encoder arranged in connection with the guide roller, arranged to determine at least one of the following: a position, a distance travelled, a speed of the elevator component relative to the guide rail.

Still further, the first and/or the second data may be arranged to include the determined information.

The present invention provides a method, a computer program product and an elevator system. The present invention provides advantages over known solutions in that the condition of a guide rail of an elevator with respect to the alignment of the rail can be detected without expensive monitoring equipment making the solution simple and cost-effective. The present invention can also be implemented to determine the quality of the guide rails.

Various other advantages will become clear to a skilled person based on the following detailed description.

The expression "a number of" may herein refer to any positive integer starting from one (1).

The expression "a plurality of" may refer to any positive integer starting from two (2), respectively.

The terms "first", "second" and "third" are herein used to distinguish one element from other element, and not to specially prioritize or order them, if not otherwise explicitly stated.

The exemplary embodiments of the present invention presented herein are not to be interpreted to pose limitations to the applicability of the appended claims. The verb "to comprise" is used herein as an open limitation that does not exclude the existence of also unrecited features. The features recited in depending claims are mutually freely combinable unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF FIGURES

Some embodiments of the invention are illustrated by way of example, and not by way of limitation, in the figures of the accompanying drawings.

DETAILED DESCRIPTION OF SOME EMBODIMENTS

Figure 1:
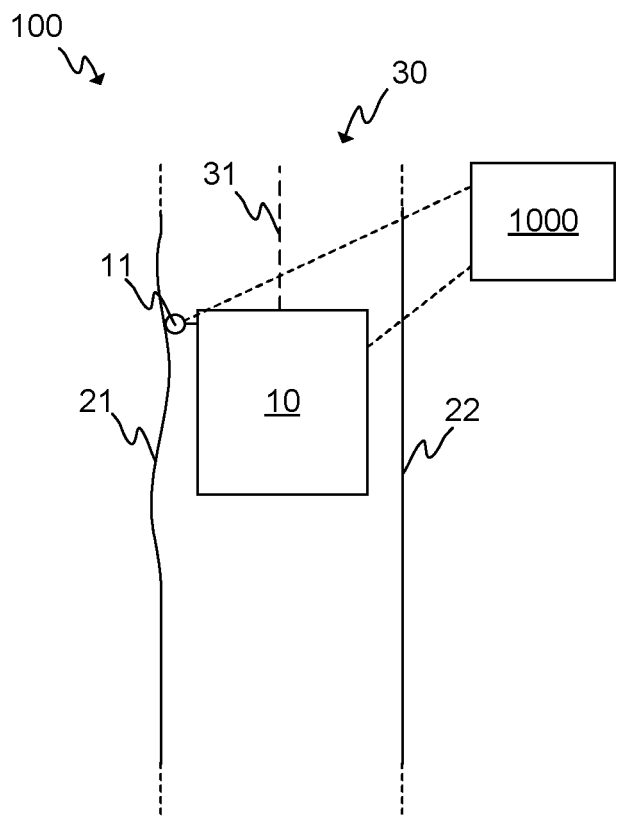
FIG. 1 illustrates schematically an elevator system according to an embodiment of the present invention.

FIG. 1 illustrates schematically an elevator system 100 according to an embodiment of the present invention. The elevator system 100 may comprise a hoistway 30, such as a vertical hoistway 30. Furthermore, the system 100 may further comprise an elevator car 10 arranged to be moved in the hoistway 30, such as by a hoisting rope 31 coupled to a hoisting motor 32. Alternatively or in addition, the elevator car 10 may be arranged to be moved by an electric linear motor.

The elevator system 100 may further comprise at least one guide rail 21, 22, for example two parallel guide rails 21, 22, and at least one elevator component 11, such as a first elevator component 11. The elevator component 11 may, preferably, be arranged to move relative to a guide rail 21, 22 and configured to meet the guide rail 21, 22 to guide the movement of the elevator car 10. The elevator component 11 may, preferably, be arranged to be coupled to the elevator car 10.

The elevator system 100 may further comprise a control unit 1000 for controlling various tasks related to the operation of the elevator system 100. The control unit 1000 may be a separate device or may be comprised in the other components of the elevator system 100. The control unit 1000 may be arranged in distributed manner (instead of being a single device) at more than two locations or in more than two devices whereas the elevator system 100 may comprise electrical and/or data connections between the control unit 1000 and various other elements of the elevator system 100, such as the elevator components 11, 12 and/or the parts of the determining means, and/or connections between different portions of the control unit 1000 for enabling controlling the operation of the elevator system 100.

The control unit 1000 may comprise one or more processors, one or more memories being volatile or non-volatile, or non-transitory, for storing portions of computer program code and any data values and possibly one or more user interface units. The mentioned elements may be communicatively coupled to each other with e.g. an internal bus.

The processor of the control unit 1000 may be configured to implement at least various tasks of the elevator system 100, such as one or several of the method steps described hereinafter. The implementation of the tasks may be achieved by arranging the processor to execute at least some portion of computer program code stored in the memory causing the processor, and thus the control unit 1000, to implement the tasks. The processor may thus be arranged to access the memory and retrieve and store any information therefrom and thereto. For sake of clarity, the processor herein refers to any unit suitable for processing information and control the operation of the control unit 1000, among other tasks. The operations may also be implemented with a microcontroller solution with embedded software. Similarly, the memory is not limited to a certain type of memory only, but any memory type suitable for storing the described pieces of information may be applied in the context of the present invention.

In various embodiments, the elevator component 11, such as the first elevator component 11, may comprise a guide element arranged to move in contact with the guide rail 21, 22, or at least along a path, a shape of which corresponds to a shape of a guide surface of the guide rail 21, 22. In an embodiment, the guide element may be a guide roller, such as of a guide roller shoe.

In addition, the elevator system 100 may comprise determining means for determining at least one of the following: a position, a distance travelled, a speed of the elevator component 11 relative to the guide rail 21, 22.

In some embodiments, the determining means may comprise a rotary encoder, such as in connection with the elevator component 11, for example, with the guide roller. Furthermore, the rotary encoder may be a magnetic encoder, that is comprising at least one magnet, or an optical encoder, or a capacitive encoder.

Alternatively, the guide rail 21, 22 may comprise at least partly along its length position markings or at least one strip of position marks, such as including magnets, whereas the elevator component 11 may comprise a reader device for reading the position markings or marks, respectively. The reader device may be in contact with the guide rail 21, 22, or may read the position markings or marks from a distance, such as at least one centimeter away from the guide rail 21, 22, or at least two centimeters, or even at least five centimeters distance from the guide rail 21, 22. The reading of the markings or marks by the reader device may be based on magnetic interaction, optical interaction or capacitive interaction between the markings or marks and the reader device. Thus, the reader device may be configured to determining at least one of the following: a position, a distance travelled, a speed of the elevator component 11 relative to the guide rail 21, 22 based on reading the position markings or marks.

Figure 2:
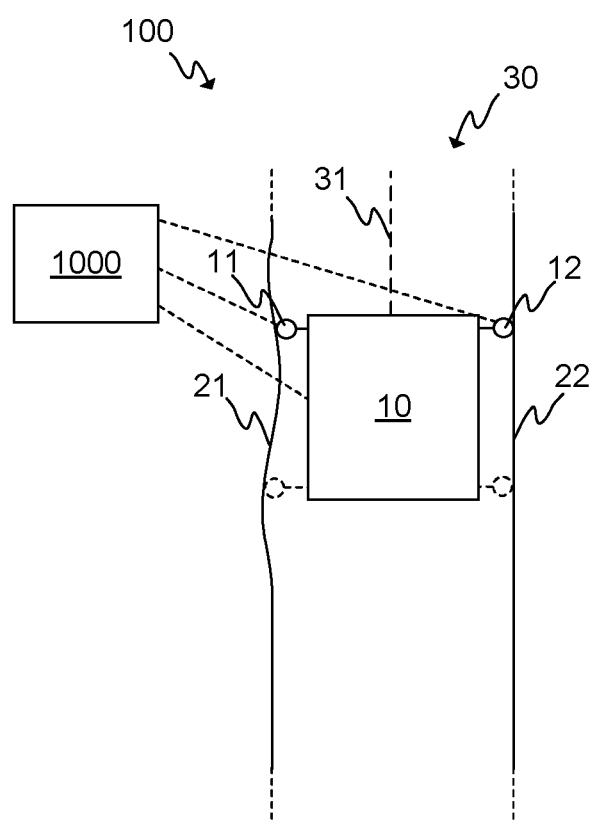
FIG. 2 illustrates schematically an elevator system according to an embodiment of the present invention.

FIG. 2 illustrates schematically an elevator system 100 according to an embodiment of the present invention. The elevator system 100 may comprise at least two guide rails 21, 22, such as two parallel guide rails 21, 22, and at least two elevator components 11, 12, such as a first elevator component 11 and a second elevator component 12. The elevator components 11, 12 may, preferably, be arranged to move relative to the guide rails 21, 22 and configured to meet the guide rails 21, 22, respectively, to guide the movement of the elevator car 10. The elevator component 11 may, preferably, be arranged to be coupled to the elevator car 10. The first 11 and the second 12 elevator components may, preferably, be arranged to move along different guide rails 21, 22, such as shown in FIG. 2.

In some embodiments, the elevator system 100 may comprise even further elevator components, such as shown with dashed lines in FIG. 2. Thus, there can be, for example, three, four, five, six, or even more elevator components.

In various embodiments, the elevator components 11, 12, such as the first elevator component 11 and the second elevator component 12, may comprise guide elements arranged to move in contact with the guide rails 21, 22, or at least along a path, a shape of which corresponds to shapes of the guide surfaces of the guide rails 21, 22, respectively. In an embodiment, the guide elements may be guide rollers, such as of guide roller shoes.

In addition, the elevator system 100 may comprise determining means for determining at least one of the following: a position, a distance travelled, a speed of the elevator components 11, 12 relative to the guide rails 21, 22, that is, one determining means or, preferably, one determining means for each elevator component 11, 12.

In some embodiments, the determining means may comprise a rotary encoder, such as in connection with the elevator component 11, for example, with the guide roller. Furthermore, the rotary encoder may be a magnetic encoder, that is comprising at least one magnet, or an optical encoder, or a capacitive encoder.

Alternatively, the guide rail 21, 22 may comprise at least partly along its length position markings or at least one strip of position marks, such as including magnets, whereas the elevator component 11 may comprise a reader device for reading the position markings or marks, respectively. The reader device may be in contact with the guide rail 21, 22, or may read the position markings or marks from a distance, such as at least one centimeter away from the guide rail 21, 22, or at least two centimeters, or even at least five centimeters distance from the guide rail 21, 22. The reading of the markings or marks by the reader device may be based on magnetic interaction, optical interaction or capacitive interaction between the markings or marks and the reader device. Thus, the reader device may be configured to determining at least one of the following: a position, a distance travelled, a speed of the elevator component 11 relative to the guide rail 21, 22 based on reading the position markings or marks.

Figure 3:
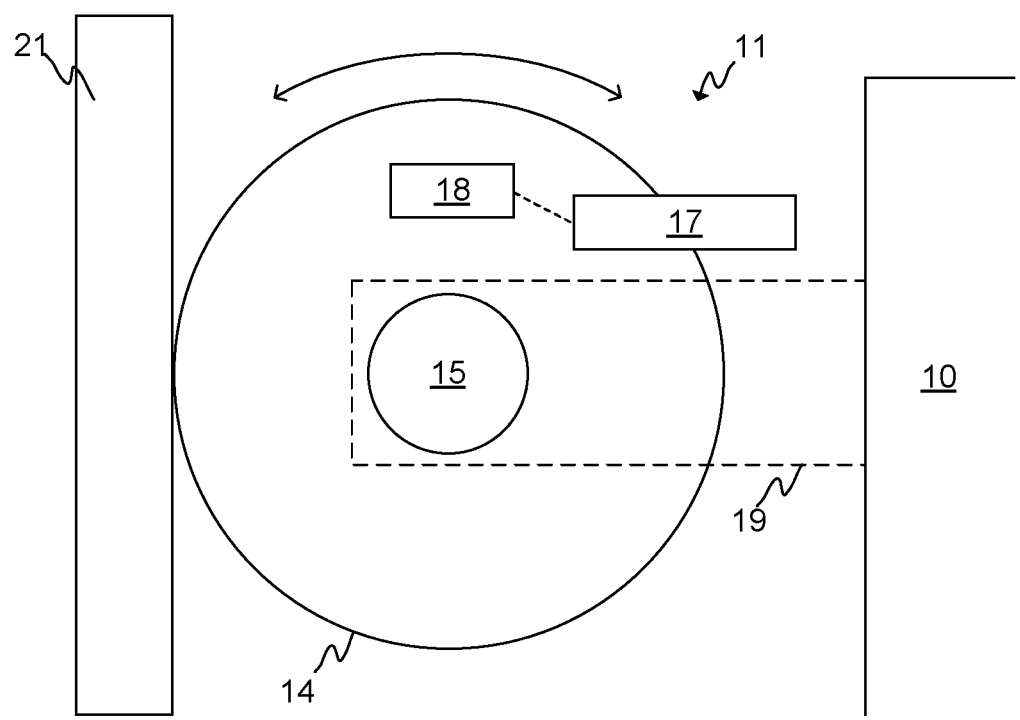
FIG. 3 illustrates schematically an elevator component and determining means according to an embodiment of the present invention.

FIG. 3 illustrates schematically an elevator component 11 and determining means according to an embodiment of the present invention. In FIG. 3, the elevator component 11 is a guide roller 14, such as of a guide roller shoe, which is arranged to be in contact and rotate along a surface of the guide rail 21, such as along the guide surface. The guide roller 14, or the guide roller shoe, may be coupled to the elevator car 10 by a support element 19. The guide roller 14 is arranged to rotate around its axis 15. The determining means in FIG. 3 comprise a magnet 18, such as a magnet ring, on the guide roller 14, and a magnetic sensing element 17, such as a quadrature sensor, arranged to sense when the magnet 18 passes the magnetic sensing element 17 when the guide roller 14 rotates. Thus, the determining means may be configured to determine at least one of the following: a position, a distance travelled, a speed of the guide roller 14, or the rotation thereof, relative to the guide rail 21.

In an embodiment, the magnetic ring may comprise alternating, evenly spaced north and south poles around its circumference.

In an embodiment, the quadrature sensor may be a Hall sensor, for example. Furthermore, the quadrature sensor may have quadrature output signals in channels A and B for the measurement of magnetic poles of the magnet ring. Furthermore, the quadrature sensor may be configured to detect changes in the magnetic field as the alternating poles of the magnet pass over it.

It is clear to a skilled person that based on the rotation of the guide roller 14, the position, the distance travelled, and/or the speed of the guide roller 14, or the rotation thereof, relative to the guide rail 21 may be determined when taking into account the dimensions of the guide roller 14 and/or the properties of the determining means.

Alternatively, the determining means may comprise an optical element, such as a hole or a reflecting element, arranged instead of the magnet, or arranged in similar manner, to the guide roller 14. Furthermore, there may be an optical sensing element arranged in similar manner as the magnetic sensing element 17 in FIG. 3 to sense when the optical element passes the optical sensing element when the guide roller 14 rotates. Thus, the determining means may be configured to determine at least one of the following: a position, a distance travelled, a speed of the guide roller 14, or the rotation thereof, relative to the guide rail 21.

Figure 4:
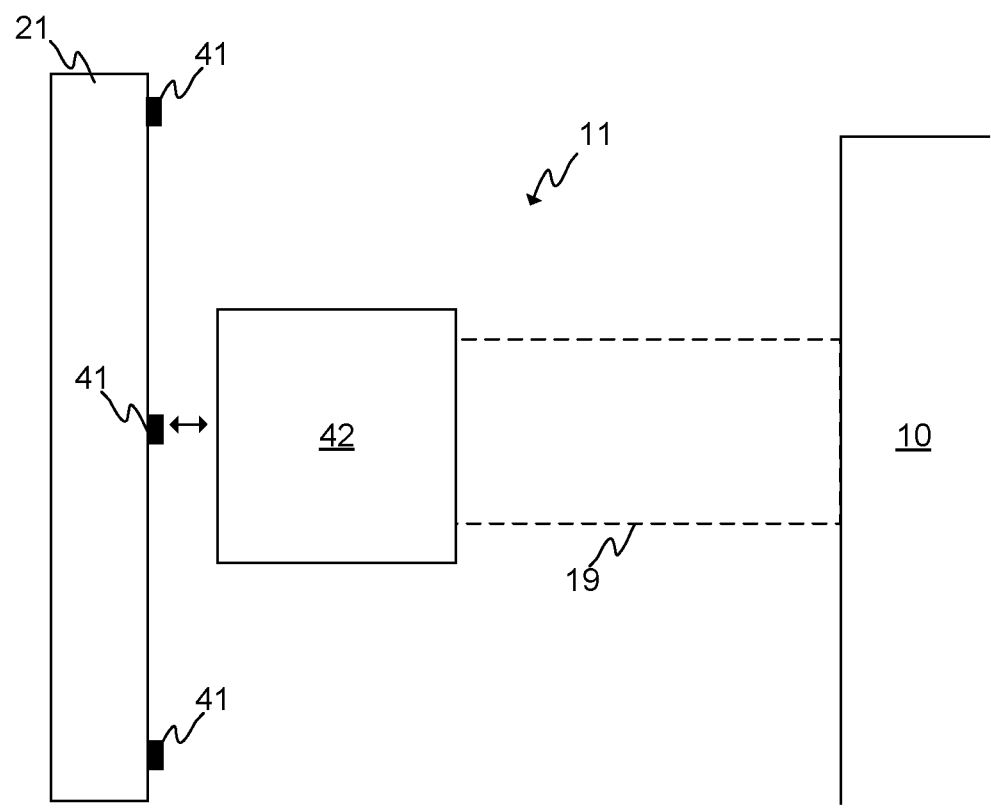
FIG. 4 illustrates schematically an elevator component and determining means according to an embodiment of the present invention.

FIG. 4 illustrates schematically an elevator component 11 and determining means according to an embodiment of the present invention. In FIG. 3, the elevator component 11, such as portion of the elevator car 10 and/or a support portion 19, comprises a reader device 42 based on magnetic interaction, optical interaction or capacitive interaction. The reader device 42 may also comprise necessary electronics for processing the signals being read by the sensor of the reader device 42. The reader device 42 may, preferably, be comprised in the determining means. Furthermore, the guide rail 21, such as on a surface thereof, may comprise position markings 41 or marks 41, such as based on magnets, ferromagnetic material, optical elements, or capacitive or inductive elements; the markings 41 or marks 41 forming one portion of the determining means. Thus, the determining means may be configured to determine at least one of the following: a position, a distance travelled, a speed of the support portion 19 and/or the reader device 42 relative to the guide rail 21.

Figure 5:
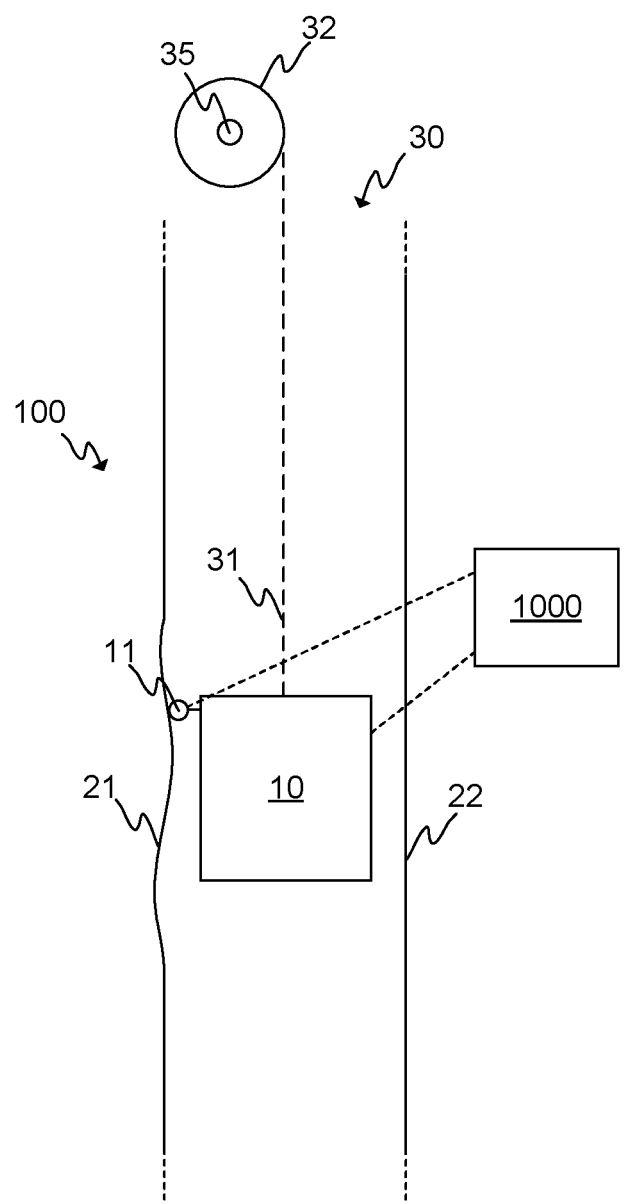
FIG. 5 illustrates schematically an elevator system according to an embodiment of the present invention.

FIG. 5 illustrates schematically an elevator system 100 according to an embodiment of the present invention. In FIG. 5, the first or the second data, or at least parts thereof, may be obtained by utilizing the hoisting motor 32 of the elevator system 100.

Thus, in some embodiments, one measurement of the movement of an elevator component 11, 12 relative to the guide rail 21, 22, which condition is to be monitored, and another measurement of the movement of the elevator car 10 in the hoistway 30 may be obtained. The movement of the elevator car 10 may be determined based on the rotation of the hoisting motor 32 (with a motor encoder 35) or, alternatively, from a speed reference curve of elevator car 10, especially during constant speed phase of elevator car travel. The motor encoder 35 may, thus, be regarded as an embodiment of the determining means.

Figure 6:
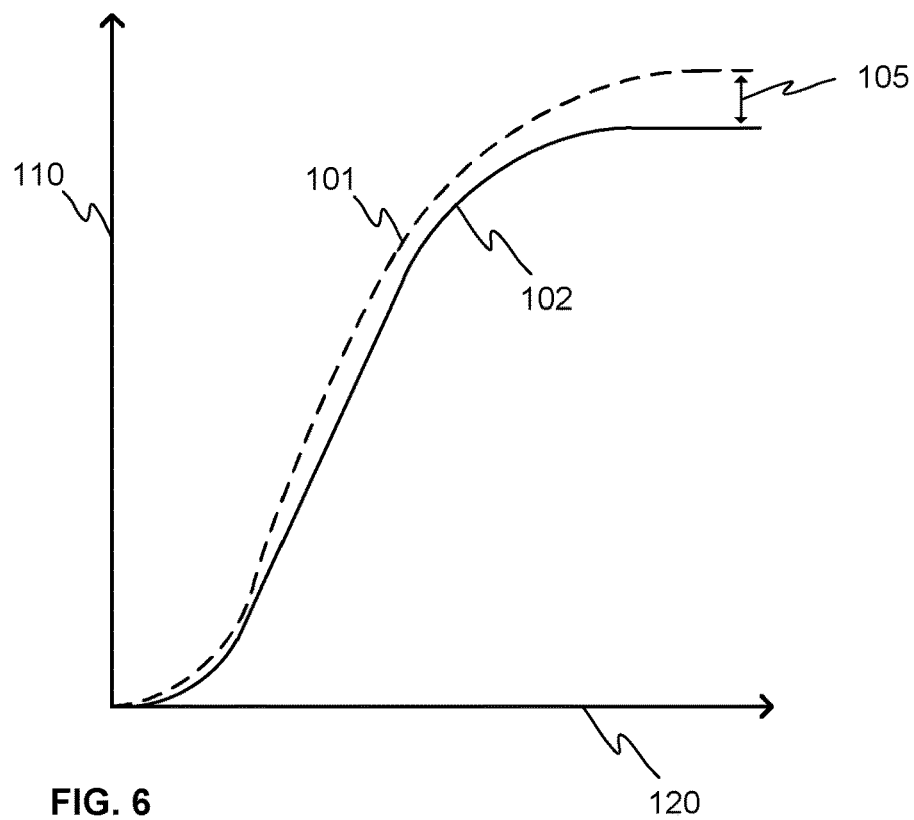
FIG. 6 shows schematically a characteristic of the first and second data according to an example of the present invention.

FIG. 6 illustrates schematically a characteristic of the first 101 and second 102 data according to an example of the present invention. The vertical axis 110 represents a position of the elevator component 11, 12 or a distance being travelled or moved relative to the guide rail 21, 22. The horizontal axis 120 represents time. Thus, as can be seen, the first 101 and the second data 102 may include information about the movement of the elevator component 11, 12 in relation to a guide rail 21, 22 in the form of data of the position or the distance as a function of time. Furthermore, FIG. 6 shows a deviation 105 between the sets of first and second data 101, 102, or at least between characteristics determined based on the data 101, 102, for example, the final position/total distance.

As can be seen in FIG. 6, the final position or the distance travelled according to the first data 101 is greater or longer than the corresponding values based on the second data 102. One example of this can be seen in FIG. 2 in which the first guide rail 21 is bent or buckled whereas the second guide rail 22 is essentially straight. Thus, if the position or distance are being determined such as shown in FIG. 6, the alignment of the guide rails 21, 22 can be monitored.

In FIG. 6, the first data 101 and the second data 102 with respect to the elevator components 11, 12 may have been determined substantially simultaneously from the first guide rail 21 and the second guide rail 22, respectively. However, alternatively, the first data 101 may be a reference data, such as determined during a setup run of the elevator system 100. In such cases, the second data 102 may be determined relative to the same guide rail as the first data 101, however, subsequently with respect to the first data 101. Thus, the first data 101, or the reference data, may indicate that the guide rail 21, 22 has been straight and in good condition. However, the second data 102 determined at a later stage, may indicate that the guide rail 21, 22 has been bent or buckled, thus, indicating, as a result of the comparison of the data 101, 102 a degraded guide rail condition.

In various embodiments, the elevator system 100 may be configured to utilize both alternatives, that is, to use the reference data, and simultaneously determined sets of first 101 and second 102 data.

Figure 7:
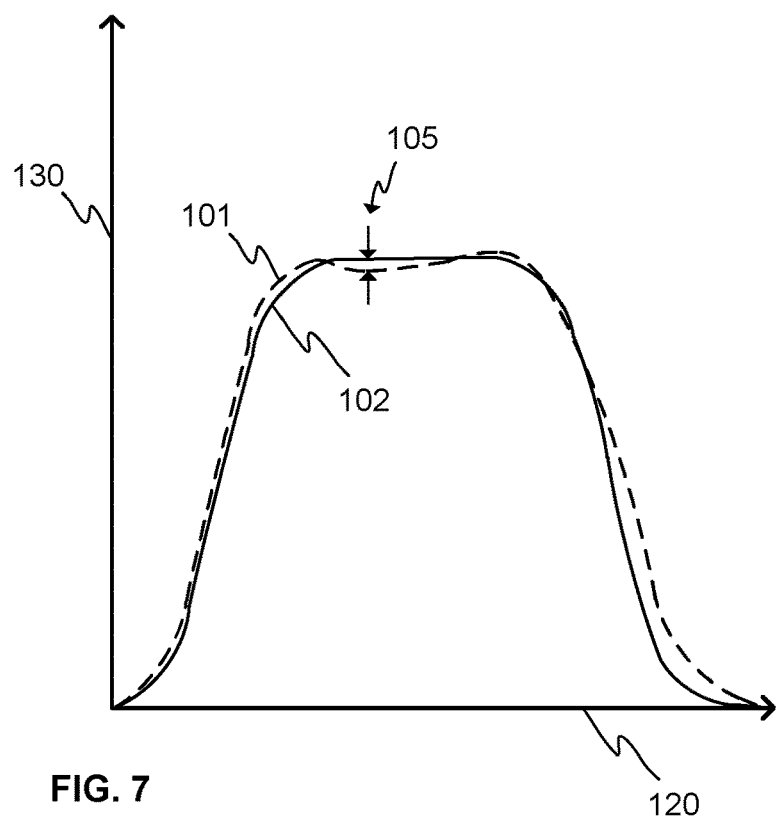
FIG. 7 shows schematically a characteristic of the first and second data according to an example of the present invention.

FIG. 7 illustrates schematically a characteristic of the first 101 and second 102 data according to an example of the present invention. The vertical axis 110 represents an instantaneous speed of the elevator component 11, 12. The horizontal axis 120 represents time. Thus, as can be seen, the first 101 and the second data 102 may include information about the movement of the elevator component 11, 12 in relation to a guide rail 21, 22 in the form of data of the speed as a function of time. Furthermore, FIG. 6 shows a deviation 105 between the sets of first and second data 101, 102, or at least between characteristics determined based on the data 101, 102, for example, the speed at some instance of time or an average speed during the total measurement period.

As can be seen in FIG. 7, instantaneous speed according to the first data 101 at the time instance of the deviation 105 is lower than the corresponding value based on the second data 102. Thus, the elevator component 11, 12 must move faster when the guide rail 21, 22 is bent or buckled because the distance to move is longer. Thus, if the speeds are being determined such as shown in FIG. 7, the alignment of the guide rails 21, 22 can be monitored.

In FIG. 7, the first data 101 and the second data 102 may have been determined substantially simultaneously from the first guide rail 21 and the second guide rail 22, respectively. Alternatively, the first data 101 may be a reference data, such as determined during a setup run of the elevator system 100. In such cases, the second data 102 may be determined relative to the same guide rail as the first data 101, however, subsequently with respect to the first data 101. Thus, the first data 101, or the reference data, may indicate that the guide rail 21, 22 is straight and in good condition. However, the second data 102 determined at a later stage, may indicate that the guide rail 21, 22 has been bent or buckled.

Related to both of FIGS. 6 and 7, the portions of the guide rails 21, 22 of which the data 101, 102 are being determined should be substantially the same, that is, the same distance of one guide rail 21, 22 at two time intervals, or the same distance of both guide rails 21, 22 determined simultaneously or at different time instances in order to obtain comparable data. However, the portions of the guide rail or rails 21, 22 may be just a part of the total length of the guide rail 21, 22, or even the total length of the guide rail 21, 22.

Figure 8:
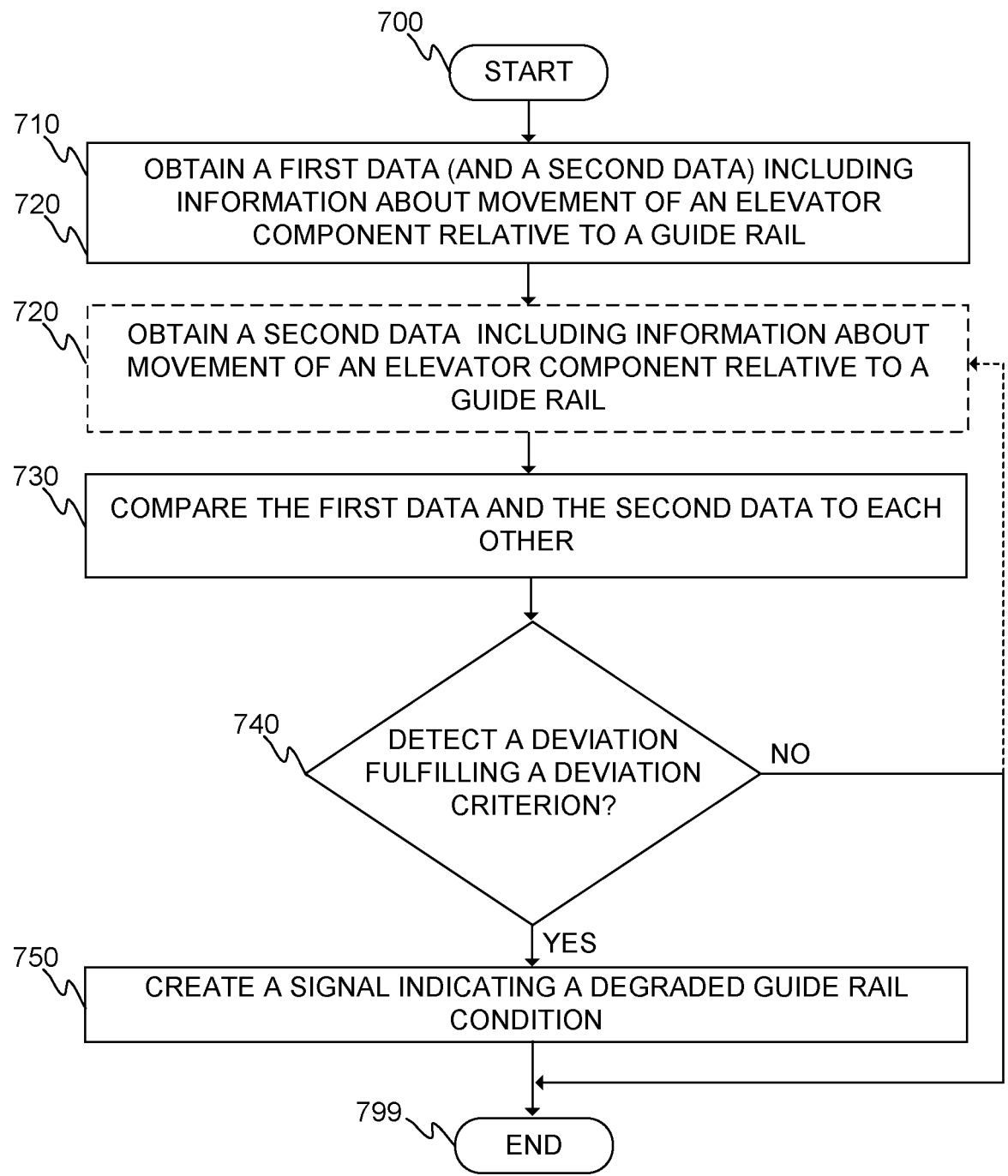
FIG. 8 shows a flow diagram of a method according to an embodiment of the present invention.

FIG. 8 shows a flow diagram of a method according to an embodiment of the present invention. The embodiments of the method may be performed in an elevator system 100 as shown in FIGS. 1, 2, and 5, and described in connection thereto. Furthermore, the elevator component 11, 12 and/or the determining means being utilized may be as shown in FIGS. 3-5, and described in connection thereto.

Step 700 refers to a start-up phase of the method. Suitable equipment and components are obtained, and systems assembled and configured for operation.

Step 710 refers to obtaining a first data including information about movement of an elevator component 11, such as of a first elevator component 11, relative to a guide rail 21, such as to a first guide rail 21.

Step 720 refers to obtaining a second data including information about movement of an elevator component 11, such as of the first 11 or a second elevator component 12, relative to a guide rail 22, such as to the first guide rail 21 or a second guide rail 22.

As can be seen in FIG. 8, steps 710 and 720 may be performed substantially simultaneously (of a plurality of guide rails) or subsequently (of the same guide rail or of different guide rails) as described hereinbefore with respect to FIGS. 6 and 7.

In an embodiment, the first data 101 may include information about the movement of a first elevator component 11 relative to a first guide rail 21, and the second data 102 may include information about the movement of a second elevator component 12 relative to a second guide rail 22. Additionally, the first data 101 and the second data 102 may include information about movement during same time instances or intervals.

Alternatively, the first data 101 may include information about the movement of a first elevator component 11 relative to a first guide rail 21 during a first time interval, and the second data 102 may include information about the movement of the first elevator component 11 relative to the first guide rail 21 during a second time interval.

In some embodiments, the elevator component 11, 12, such as the first 11 and/or the second elevator component 12, may comprise a guide element arranged to move in contact with the guide rail 21, 22, or at least along a path, a shape of which corresponds to a shape of a guide surface of the guide rail 21, 22. The elevator component 11, 12 may further comprise, or at least be in connection thereto, determining means for determining at least one of the following: a position, a distance travelled, a speed of the elevator component relative to the guide rail. In such cases, the method may comprise determining, by the determining means, at least one of the following: the position, the distance travelled, the speed of the elevator component 11, 12 relative to the guide rail 21, 22. The first 101 and/or the second data 102 may then be arranged to include the determined information. Optionally, the guide element may be a guide roller, such as of a guide roller shoe.

In some embodiments, the determining means may comprise a rotary encoder, such as in connection with the guide roller 14. In such cases, the method may comprise determining, by the rotary encoder, at least one of the following: the position, the distance travelled, the speed of the elevator component relative to the guide rail. Still further, the rotary encoder may be a magnetic encoder or an optical encoder or a capacitive encoder, or an inductive encoder, such as arranged to the elevator component 11, 12 or at least in functional connection thereto.

In various embodiments, the guide rail 11, 12 may comprise at least partly along its length position markings 41 or at least one strip of position marks 41, such as including magnets; and the elevator component 11, 12, such as the first 11 and/or the second elevator component 12, may comprise a reader device 42 for reading the position markings 41 or marks 41, respectively. In such embodiments, the method may comprise determining, by the reader device 42, at least one of the following: a position, a distance travelled, a speed of the elevator component relative 11, 12 to the guide rail 21, 22, wherein the first 101 and/or the second data 102 may be arranged to include the determined information.

Alternatively, in some embodiments, the second data 102 may be or may correspond to a movement reference curve of an elevator car 10.

Yet in another embodiments, the second data 102 may include information about movement of an elevator car 10, such as relative to a longitudinal direction of a hoistway 30. Thus, the second data 102 may have been obtained by utilizing a motor encoder 35 in connection with the hoisting motor 32. The elevator component may, preferably, be coupled to the elevator car 10.

Step 730 refers to comparing the first data and the second data, or characteristics based on said data to each other. The comparison may be performed, for example, based on what is shown in FIG. 6 or 7, and described in connection thereto. For example, the comparison may be done by comparing the final position or total distance travelled. Alternatively, the comparison may be based on comparing instantaneous or average speeds defined based on the data 101, 102.

Step 740 refers to detecting, based on the comparison, a deviation fulfilling a deviation criterion. In some embodiments, the deviation criterion may be at least one percent, or at least five percent, or at least ten percent difference between the first 101 and the second data 102, or between the characteristics of said data 101, 102, such as between the final positions, the total distance, instantaneous speeds, or average speeds.

Thus, in various embodiments, the method may comprise determining, by the determining means, at least one of the following: the position, the distance travelled, the speed of the elevator component relative to the guide rail, wherein the first 101 and/or the second data 102 is arranged to include the determined information.

As can be seen in FIG. 8, if the deviation 105 does not fulfill the deviation criteria, performing the method may, for example, be ended, or a new set of second data 102 may be obtained for performing a new comparison.

Step 750 refers to creating a signal indicating the degraded, such as misaligned, guide rail condition, such as of the first or the second guide rail. The signal may be created or generated in the control unit 1000, for instance, and then provided to the operator by means of an alert or report. The information of the degraded condition may be sent to a service center via a remote link, such that guide rail maintenance can be added to a future maintenance schedule.

In some embodiments, the method may comprise sending information about the degradation of a guide rail, that is related to said created signal, preferably information about the degree of degradation of the guide rail, to a remote maintenance server. The information may be used for preventive maintenance of elevators (elevator maintenance service may be provided before the progressing degradation causes interruption of elevator operation).

Method execution is ended at step 799. The method may be performed once, intermittently, periodically, continuously or, on demand.

The inventive solution may be implemented in all elevators with guide rollers, using (already-existing) elevator controller hardware with some software modifications. Monitoring can be done during normal elevator operation such that it is not necessary to take elevator out of use for the duration of measurement or monitoring.

The invention claimed is:

1. A method for determining a degraded guide rail condition in an elevator system, comprising:
   operating the elevator system, the elevator system including:
      a hoisting motor including a motor encoder;
      an elevator cart; and
      an elevator component arranged to move relative to a guide rail, wherein the guide rail includes at least partly along a length thereof, position markings, and wherein the elevator component is arranged to move in contact with the guide rail and includes a rotary encoder for measuring movement of the elevator component relative to the guide rail, and a reader device for reading the position markings;
   obtaining, by the rotary encode and the reader device, first data including information about movement of the elevator component relative to the guide rail;
   obtaining, by a motor encoder, second data including information about movement of the elevator component relative to a hoistway of the elevator system;
   comparing the first data and the second data, or characteristics based on said first and second data to each other;
   detecting, based on the comparison, a deviation fulfilling a deviation criterion;
   subsequently, creating a signal indicating a guide rail buckling based on the deviation; and
   sending the signal to trigger a guide rail maintenance alert,
   wherein the first data is a distance travelled by the elevator component or a speed of the elevator component measured along a guide surface of the guide rail relative to the guide surface of the guide rail, and the second data is a distance travelled by the elevator cart or a speed of the elevator cart measured in a longitudinal direction of the hoistway of the elevator system relative to the hoistway of the elevator system.

2. The method of claim 1, wherein the comparison relates to comparing a first distance in the first data and a second distance in the second data to each other.

3. The method of claim 1, wherein the comparison relates to comparing a first speed in the first data and a second speed in the second data to each other.

4. The method of claim 1, wherein the second data is a movement reference curve of an elevator car.

5. The method of claim 1, wherein the deviation criterion is at least one percent, or at least five percent, or at least ten percent difference between the first and the second data, or between the characteristics of said data.

6. The method of claim 1, wherein the first data and the second data include information about movement during same time instances or intervals.

7. The method of claim 1, wherein the elevator component comprises a guide element arranged to move in contact with the guide rail, or at least along a path, a shape of the path corresponding to a shape of the guide surface of the guide rail.

8. The method of claim 7, wherein the guide element is a guide roller.

9. The method of claim 1, wherein the rotary encoder is a magnetic encoder.

10. The method according to claim 1, further comprising the step of sending information about the degradation of the guide rail to a remote maintenance server.

11. A computer program product, stored in a device including a non-transitory memory, comprising program instructions which when executed by a control unit cause the elevator system to perform the method according to claim 1.

12. An elevator system comprising:
   an elevator cart;
   a hoisting motor including a motor encoder;
   at least one elevator component;
   at least one guide rail, wherein the at least one elevator component is arranged to move relative to the at least on guide rail, and wherein the at least one guide rail includes at least partly along a length thereof, position markings, and the at least one elevator component is arranged to move in contact with the guide rail and includes a rotary encoder for measuring movement of the at least one elevator component relative to the at least one guide rail, and a reader device for reading the position markings; and
   a control unit comprising at least one processor and at least one memory for storing at least one portion of computer program code therein, configured to:
      control the rotary encode and the reader device to obtain first data including information about movement the at least one elevator component relative to the at least one the guide rail;

control the motor encoder to obtain second data including information about movement of the at least one elevator component relative to a hoistway of the elevator system;
compare the first data and the second data, or characteristics based on said data-to each other;
detect, based on the comparison, a deviation fulfilling a deviation criterion;
subsequently, create a signal indicating a guide rail buckling based on the deviation; and
send the signal to trigger a guide rail maintenance alert,
wherein the first data is a distance travelled by the elevator component or a speed of the elevator component measured along a guide surface of the guide rail relative to the guide surface of the guide rail, and the second data is a distance travelled by the elevator cart or a speed of the elevator cart measured in a longitudinal direction of the hoistway of the elevator system relative to the hoistway of the elevator system.

13. The method of claim 2, wherein the comparison relates to comparing a first speed in the first data and a second speed in the second data to each other.

14. The method of claim 2, wherein the second data is a movement reference curve of an elevator car.

* * * * *